US012327645B2

(12) United States Patent
Kryukov et al.

(10) Patent No.: US 12,327,645 B2
(45) Date of Patent: Jun. 10, 2025

(54) REMIX—FUEL FOR A NUCLEAR FUEL CYCLE

(71) Applicant: Federal State Unitary Enterprise "Mining And Chemical Combine"(FSUE "MCC"), Krasnoyarsk (RU)

(72) Inventors: Oleg Vasilyevich Kryukov, Moscow (RU); Petr Mikhailovich Gavrilov, Krasnoyarsk (RU); Konstantin Vladimirovich Ivanov, Moscow (RU); Anzhelika Viktorovna Khaperskaya, Moscow (RU); Aleksandr Mikhailovich Pavlovichev, Moscow (RU); Yury Mikhailovich Semchenkov, Moscow (RU); Yury Stepanovich Fyodorov, Saint Petersburg (RU); Boris Yakovlevich Zilberman, Saint Petersburg (RU); Vyacheslav Anatolyevich Dudukin, Saint Petersburg (RU); Gleb Alexeyevich Apalkov, Krasnoyarsk (RU)

(73) Assignee: Federal State Unitary Enterprise "Mining and Chemical Combine" (FSUE "MCC"), Krasnoyarsk (RU)

( * ) Notice: Subject to any disclaimer, the term of this patent is extended or adjusted under 35 U.S.C. 154(b) by 927 days.

(21) Appl. No.: 17/619,826

(22) PCT Filed: Oct. 16, 2019

(86) PCT No.: PCT/RU2019/000740
§ 371 (c)(1),
(2) Date: Dec. 16, 2021

(87) PCT Pub. No.: WO2020/197435
PCT Pub. Date: Oct. 1, 2020

(65) Prior Publication Data
US 2022/0367072 A1    Nov. 17, 2022

(30) Foreign Application Priority Data

Mar. 26, 2019 (RU) ................................ 2019108804

(51) Int. Cl.
*G21C 3/62* (2006.01)
(52) U.S. Cl.
CPC .................................... *G21C 3/623* (2013.01)
(58) Field of Classification Search
None
See application file for complete search history.

(56) References Cited

U.S. PATENT DOCUMENTS

| 4,018,697 | A  | 4/1977  | Smith     |
| 2017/0294238 | A1 | 10/2017 | Zheng     |
| 2018/0226160 | A1 | 8/2018  | Wada      |
| 2018/0286528 | A1 | 10/2018 | Katalenich |

FOREIGN PATENT DOCUMENTS

RU        2537013        12/2014

OTHER PUBLICATIONS

International Search Report and Written Opinion dated Jan. 30, 2020 in related application PCT/RU2019/000740 filed Oct. 16, 2019 (6 pages).

*Primary Examiner* — Tanisha Diggs
(74) *Attorney, Agent, or Firm* — Dentons US LLP

(57) ABSTRACT

The invention relates to the field of nuclear technologies, in particular to an oxide-based uranium-plutonium nuclear fuel for an atomic power station with thermal neutron reactors. The technical result of the invention is the development of a REMIX-type fuel composition formulation making it possible, in the nuclear fuel cycle, to involve fissile nuclear materials regenerated from spent nuclear fuel with the simultaneous use of enriched natural uranium, and also moreover providing a solution to the problems of separately using previously isolated plutonium (including weapons-grade plutonium), of reducing the quantity of spent nuclear fuel by recycling fissile materials from spent nuclear fuel during the lifespan of a nuclear reactor (up to 5 recyclings), of economizing on natural uranium for manufacturing fuel and, as a result, of making the nuclear fuel cycle self-sustainable. The invention makes it possible to use REMIX fuel for solving an entire range of problems which a closed nuclear fuel cycle may face, taking into account the number of reactors, availability of natural uranium and the amount of stored spent nuclear fuel.

1 Claim, No Drawings

REMIX—FUEL FOR A NUCLEAR FUEL CYCLE

This patent application claims priority to PCT International Application PCT/RU2019/000740 filed 16 Oct. 2019; which claims a benefit of RU2019108804 filed 26 Mar. 2019; each of which is herein incorporated by reference in its entirety for all purposes.

The invention is included in the field of nuclear technologies, in particular, to oxide uranium-plutonium nuclear fuel of NPPs with thermal neutron reactors.

Currently Russia has accumulated around 22.5 thousand ton spent nuclear fuel (SNF), and another 650-700 tons of SNF are discharged from reactors on an annual basis. The SNF handling strategy provides for two options: SNF reprocessing with recycling of uranium and plutonium and conditioning of radioactive waste (RW) or direct disposal of SNF in geologic formations.

The most effective method of SNF handling is its involvement into a closed nuclear fuel cycle (NFC) with reprocessing and return to fuel cycle (recycle) of fissionable materials (uranium and plutonium) contained in SNF. The closed nuclear fuel cycle may be implemented using both fast and thermal neutron reactors. The fuel for fast neutron reactors (MOX-fuel) in this case is oxide uranium-plutonium fuel manufactured from depleted waste uranium and plutonium recovered from SNF.

The closed NFC with thermal neutron reactors may be implemented using REMIX fuel as NPP fuel, which contains uranium and plutonium extracted from SNF, with enrichment of some recovered uranium and addition of enriched natural uranium to provide for equal energy potential as in fuel from enriched natural uranium (for VVER type (pressurized water) reactors).

A fuel composition is known for water-cooled thermal neutron NPP reactors [patent RU 2537013, published on Dec. 27, 2014] of REMIX type, which was chosen as a prototype and includes a mixture of recovered plutonium and enriched uranium in the form of oxides. Enriched uranium is enriched recovered uranium with the component ratio determined by energy potential equal to potential of freshly made NPP fuel from enriched natural uranium providing for 100% charge of the reactor core.

In particular, for a VVER-1000 reactor with standard SNF burnout of 50 GW*day/t, the composition contained recovered plutonium in concentrations up to 5.25% plutonium and from 4.2 to 3.5% U-235 in a mixture with its other isotopes, accordingly, with provision of an equal energy potential with fresh fuel from natural uranium with enrichment of 4.33% U-235. The composition may contain recovered plutonium and some uranium recovered together with it without enrichment.

The known fuel composition is irradiated in maximum burnout mode in serial reactors specially identified for this purpose with increased number of overloads so that uranium from such SNF (or all SNF as a whole) would not be of interest by quantity of isotope U-235 for cycling in a closed NFC.

The known composition is received after NPP SNF reprocessing with the help of Purex process in an option of generating a plutonium re-extract in a mixture with some recovered uranium, the uranium re-extract produced on the next stage is subjected to evaporation and denitration, uranium oxide is fluoridated, and the final uranium hexafluoride is enriched by U-235 until its content is 5-6%. The product is defluorinated, and oxide is dissolved in the above re-extract with achievement of the rated isotope composition.

The mixed product is exposed to denitration, and fuel pellets and then fuel assemblies (FA) are made from the produced solid solution of uranium and plutonium oxide mixture. A small part (up to 10%) of enriched natural uranium may be added to enriched recovered uranium to regulate the energy potential.

The disadvantages of the known fuel composition include the need to engage separate process lines for enrichment of recovered uranium used as one of components of the fuel composition.

The objective of this invention is development of a fuel composition of REMIX type with energy potential equal to potential of a freshly made NPP fuel from enriched natural uranium providing for 100% charge of the thermal reactor core.

The technical result of the invention is development of REMIX type fuel composition that enables involvement of nuclear fissionable materials recovered from SNF into NFC with simultaneous use of enriched natural uranium, and also solves objectives of recycling a separate plutonium extracted previously (including weapon-grade plutonium), reduction of SNF quantity with recycling of fissionable materials from SNF for the period of nuclear reactor operation (up to 5 recycles), natural uranium savings for fuel manufacturing, and ensuring NFC self-sufficiency as a result.

To achieve the above technical result, REMIX fuel of the nuclear fuel cycle includes a mixture of recovered plutonium and enriched uranium in the form of oxides with ensuring equal energy potential with fuel from enriched natural uranium and possibility of 100% charge of thermal neutron reactor core, besides, to ensure equal energy potential with fuel from enriched natural uranium, REMIX fuel contains plutonium produced from reprocessing of VVER type reactor in the amount of 1-2% wt with Pu-239 isotope content of more than 51%, enriched natural uranium in the amount of 17-19% wt with U-235 isotope content of 19.75%, recovered uranium produced from reprocessing of VVER type reactor SNF in the amount of more than 80% wt.

The specified content of recovered uranium and plutonium in REMIX fuel makes it possible to use REMIX fuel to solve the entire spectrum of objectives that may be set before the closed NFC with account of the quantity of reactors, availability of natural uranium, quantity of accumulated SNF.

The initial recovered plutonium and uranium for REMIX fuel may represent both separately produced products and a solid mix of uranium and plutonium extracted by SNF reprocessing.

The solid mix of uranium and plutonium may be produced as a result of radiochemical (simplified Purex process) reprocessing of VVER type reactor SNF in the Experimental and Demonstration Center (EDC) of the Federal State Unitary Enterprise Mining and Chemical Combine (FSUE MCC). Enrichment of some natural uranium, as well as manufacturing of nuclear fuel pellets, production of fuel elements and fuel assemblies (FA) shall be carried out using the established technology.

FAs are irradiated in serial VVER type reactors (with burnout of more than 50 GW*day/t).

Plutonium content in the amount of 1-2% wt within REMIX fuel composition makes it possible, with minor upgrades (in part of personnel radiation protection), to use process lines of NPP nuclear fuel production from enriched natural uranium to produce REMIX fuel to maximum effect.

The invention claimed is:

1. A REMIX fuel for a nuclear fuel cycle comprising a mixture of regenerated plutonium and enriched uranium in the form of oxides providing the same energy potential as a fuel from enriched natural uranium, and suitable for 100% load of a thermal neutron reactor core, characterized in that the REMIX fuel contains comprises:

- from 1 to 2 wt % of plutonium dioxide obtained from reprocessing VVER spent nuclear fuel, and comprising over 51% of isotope Pu-239,
- from 17 to 19 wt % of enriched natural uranium dioxide comprising 19.75% of U-235 isotope, and
- from 79 to 82 wt % of regenerated uranium dioxide obtained from reprocessing of VVER spent nuclear fuel.

* * * * *